United States Patent Office 2,944,136
Patented July 5, 1960

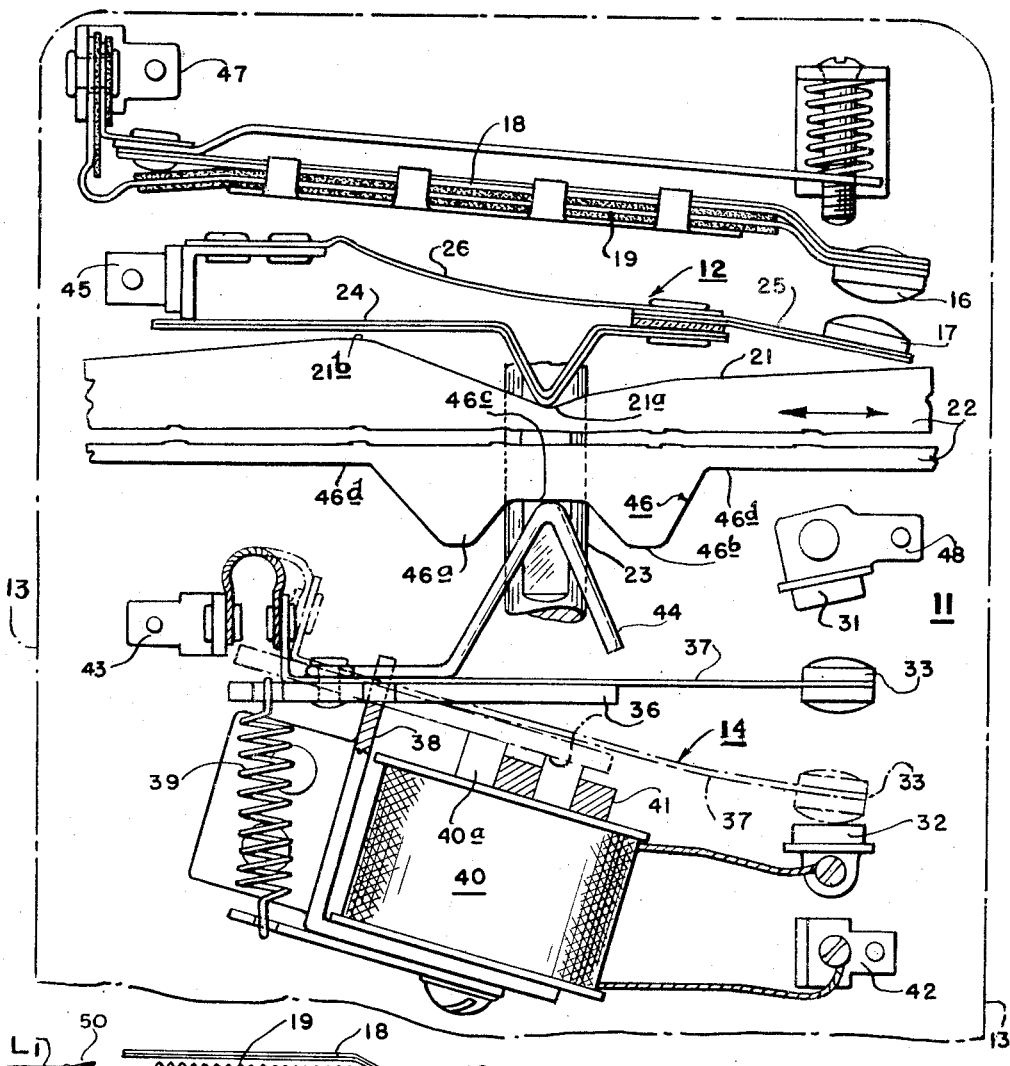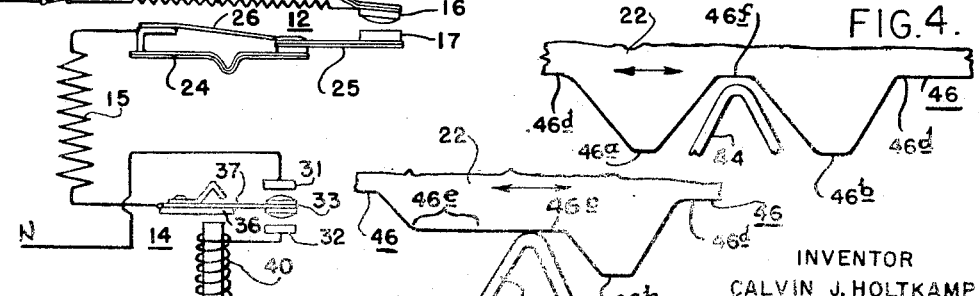

2,944,136
CONTROL FOR FLASHING ELECTRIC HEATERS

Calvin J. Holtkamp, Mansfield, Ohio, assignor to Westinghouse Electric Corporation, East Pittsburgh, Pa., a corporation of Pennsylvania Continuation of application Ser. No. 640,827, Feb. 18, 1957. This application Jan. 26, 1959, Ser. No. 789,210

10 Claims. (Cl. 219—20)

This invention relates to a control for an electrical resistance heater and particularly to a switching mechanism for initially connecting such heater to effect flashing or abnormally high energization thereof for a predetermined period and thereafter controlling its average wattage output at a lower level.

The term "flashing" is commonly used in connection with electric heaters to denote a condition of energization in which a heating element is over-energized to provide an abnormally high wattage input that cannot be tolerated continuously for an indefinite period without damaging the heater. However, this abnormal energization may be effected for a short controlled period of time to rapidly bring the heater up to approximately the temperature at which it may be operated continuously and thereafter the heater may be controlled at a lower level of energization to provide continued heating. Such an arrangement is particularly desirable for surface heating units on domestic electric ranges to reduce the delay experienced by the user between the time the heater control switch is manually operated and the time at which the heater is hot enough to heat a coking vessel at a desired rate.

It is an object of this invention to improve the construction of a switching mechanism of the above type to improve the safety of its operation, simplify its construction and prolong the life of its contacts.

It is another object of this invention to improve the construction of a switch of the above type to permit the voltage applied to an electrical resistance heater to be switched from a high to a lower value during a period of deenergization of the heater.

Still another object of this invention is to provide an improved flashing control which may be readily adapted for use with an infinitely adjustable cycling control switch, whereby the latter may be used to regulate both a period of abnormal energization of the heater and, thereafter, a desired average wattage input to the heater.

Another object of this invention is to reduce the number of electrical contacts required in a switch of the above type which may be operated to completely isolate a heater from a power source when the switch is adjusted to an "off" position.

In accordance with this invention a control for flashing a resistance heater comprises an improved transfer switch combined with and controlled by a cycling control switch for shifting the energization of the heater from an initial abnormally high level to a continuously regulated lower level. The cycling control switch includes a cam that is adjustable from an "off" position to any of a plurality of active positions to close the switch and adjust it to provide different average wattage inputs to the heater. The flashing switch is also actuated by a cam jointly operable with the other cam to shift the flashing switch to the over-energization position when the wattage control switch is adjusted from "off" to an active position. An electromagnet, energized in series with the cycling control switch and the main heater, holds the flashing switch in the over-energization position against a biasing force tending to move the flashing switch to the normal energization position. In response to the opening of the cycling control switch during its initial cycle of operation, both the heater and the electro-magnet are deenergized and the flashing switch is released to change the circuit connections to the heater to effect a lower level of energization during subsequent reclosures of the cycling control switch. The flashing switch includes contacts in circuit with the electromagnet actuated in response to initial deenergization of the latter to prevent its reenergization except by manipulation of the flashing switch cam.

These and other objects are effected by the invention as will be apparent from the following description taken in connection with the accompanying drawings, forming a part of this application, in which:

Fig. 1 is a view in elevation of a flashing control switch mechanism having a pair of switch structures operated by a pair of associated cam surfaces, the cam structure being shown developed for the sake of clarity;

Fig. 2 is a schematic circuit showing the connections for a control mechanism, as shown in Fig. 1, for controlling the energization of a heating element from a conventional three-wire power source; and Figs. 3 and 4 show different modifications of one of the cam surfaces of the cam structure of Fig. 1.

Referring to Fig. 1 of the drawings, a flashing control mechanism 11 comprises an infinitely adjustable cycling control switch 12 and a flashing switch 14, these switches being supported by a common base 13 and jointly connectible to control the energization of an electrical resistance heating element shown at 15 in Fig. 2. The switches 12 and 14 are adjustable to provide a predetermined period of abnormal energization of the heater 15 to quickly bring the temperature of the latter up to a desired value and, thereafter, effect control of the average wattage input to said heater at a predetermined lower value.

The cycling control switch 12 comprises a pair of relatively movable contacts 16 and 17, contact 16 being cycled away from and toward the other contact 17 by the heating and cooling, respectively, of a thermally responsive bimetallic element 18. The latter responds to the heating and cooling of an associated resistance heating element 19 connected in series with the switch 12. The other contact 17 is adjustably positioned by a surface 21 of a cam means 22 rotatably supported on the base 13, the cam means being manually adjustable for movement indicated by the arrows thereon by means of a rotatable shaft 23. A cam follower associated with structure supporting the adjustable contact comprises a bimetallic strip 24 biased into engagement with the active surface 21 by an electrically conducting spring strip 26 to position the adjustable contact 17. The bimetal 24 is responsive to temperature ambient the switch 12 to compensate therefor and keep the duty cycle of the switch independent of changes in ambient temperature. The switch 12 also includes a smaller contact-accelerating bimetal 25 connected in series with contacts 16 and 17. The bimetal 25 is attached at one end to the bimetal 24 and strip 26 and supports on its other end, the adjustable contact 17. Each of the bimetal strips 18, 24 and 25 is positioned with its low expansion side facing upwardly, or at the top, as shown in Fig. 1. The cycling control switch 12 described above is generally similar to that described and claimed in Risacher et al. Patent No. 2,813,173, granted November 12, 1957 and assigned to the assignee of the present invention.

The flashing switch 14 comprises a pair of spaced relatively stationary contacts 31 and 32 with a contact 33 therebetween movable into engagement with one or the other of the contacts 31 and 32. The contact 33 is supported by structure comprising a pivotally mounted magnetic armature 36 which has connected thereto a resilient electrically conducting lever 37 on the end of which the contact 33 is affixed. The armature 36 is pivotally supported on a magnetic bracket 38 which is fastened to the base 13 and forms part of the magnetic circuit of an alternating current electromagnet 40. The armature 36 is biased counterclockwise (as seen in Fig. 1) by means of a tension spring 39. The electromagnet 40 may be provided with a conventional magnetic core 40a and a shading coil 41. One end of the winding of the electromagnet is connected to stationary contact 32 and its other end is connected to a terminal 42 on the base 13. Other terminals are also fixed to the base 13 and facilitate making electrical connections, according to the circuit of Fig. 2, as follows: terminal 43 to the arm 37 carrying contact 33, terminal 45 to the structure supporting contact 17, terminal 47 to one end of the heater 19 and terminal 48 to the stationary contact 31.

The armature 36 is movable against the bias of spring 39 by means of a resilient wire member 44 attached to the armature and forming a cam follower engageable by a second cam surface 46 of the cam means 22. The cam follower 44 may be shifted by the cam surface 46 to close contacts 33 and 32 and to position the armature so as to be attracted by the electromagnet 40 to hold the contacts 33 and 32 closed until the electromagnet is deenergized in a manner hereinafter described.

The cam surface 46 has two raised portions 46a and 46b which are engageable with the cam follower 44 to move the contact 33 into engagement with the stationary contact 32, as shown in dotted lines in Fig. 1, to effect over-energization of the heater 15. In Fig. 1, the cam means 22 is in an "off" position in which the switch 12 is open and the movable contact 33 is positioned intermediate, and out of engagement with, the contacts 31 and 32 by means of the portion 46c of the cam surface 46 lying intermediate the portions 46a and 46b.

The cam means 22 is preferably constructed to be rotatable so that the cam surfaces 21 and 46 may be moved continuously, or more than one revolution, in either direction from the "off" position shown in Fig. 1, and may be returned to the "off" position by movement in either direction. In the "off" position the cam surface 21 is engaged by the bimetal 24 at the low point 21a. In one direction from the "off" or low point 21a, the cam surface 21 rises gradually to a high point 21b, corresponding to maximum percentage of closed contact time of switch 12 and high heat output of the heater 15. In the other direction this surface rises more abruptly from 21a to the same high point 21b. The rise of the cam surface 21 on each side of the "off" point 21a is such that, as long as the bimetal 18 is cool or at its ambient temperature, the contacts of switch 12 will be closed before either high point 46a or 46b passes the cam follower 44 as the cam means 22 is adjusted from "off" to one of the active positions thereof.

In the embodiment of the invention illustrated in Fig. 1, the low point 21a on the cam surface 21 permits the contacts 16 and 17 to be separated when the control is adjusted to the "off" position. If desired, the switch 12 and the cam surface 21 may be designed so that contacts 16 and 17 may be held in engagement by the lowest point on the cam surface 21. In this latter case, a line switch 50 shown connected between L₁ and the bimetal heater 19 in Fig. 2 may be used to interrupt the circuit through the switch 12, when using the embodiments of cam surface 46 shown in Figs. 1 and 3. However, a line switch, such as the switch 50, must be used when using the type of cam surface 46 shown in Fig. 4 which permits contacts 31 and 33 to close in the "off" position, as described hereinafter. The line switch 50 may be connected by any suitable means to be operated by the shaft 23 so that this switch will be open in the "off" position and closed in all other positions of the shaft. The line switch 50 must be removed to its closed position, when the shaft 23 is adjusted in either direction from "off," before either of the high points 46a or 46b pass the cam follower 44 to insure that the flashing switch will be held in its flash position by the electromagnet 40.

The cam surface 46 is so constructed that after either high portion 46a or 46b passes the cam follower 44 in going from the "off" position, the cam surface portion 46d, which is then opposite the follower 44, will not interfere with free movement of the structure supporting contact 33 under the biasing influence of spring 39 to engage contacts 33 and 31 after the electromagnet 40 is deenergized.

The rise of cam surface 21 on both sides of the "off" point 21a is such that, in the event the user leaves the cam means 22 in the position in which either projection 46a or 46b holds the contact 33 in engagement with contact 32, the cycling control switch 12 will cycle the heater 15 at its abnormal energization voltage, but the percentage of closed contact time of the switch 12 will be sufficiently low to prevent the heater 15 from reaching destructive temperatures.

In the operation of the control, the user shifts or rotates the control shaft 23 from the "off" position, shown in Fig. 1, in either direction to an active position. This movement of the shaft causes the cam means 22 to close the contacts of switch 12 and position the movable contact 33 of the flasher transfer switch in engagement with the stationary contact 32. The circuit is then completed, which may be traced in Fig. 2 from conductor L₁ of an Edison three-wire, single phase power source through line switch 50, heater 19, contacts 16 and 17, bimetal 25, spring 26, main heater 15, resilient arm 37, movable contact 33, stationary contact 32, and the energizing winding of the electromagnet 40 to conductor L₂ of the power source. These circuit connections connect the heater 15 for energization at an abnormally high level across conductors L₁ and L₂. The voltage between L₁ and L₂ is twice that between either of these conductors and the neutral N in an Edison three-wire single phase circuit. The current flowing through the heater 19 heats the latter which, in turn, heats the bimetal 18, causing the latter to deflect and separate the contacts 16 and 17. The heating effect of heater 19 is in proportion to the heat generated in the main heater 15, and the switch 12 is designed to track the heating of the main heater 15 so that the contacts 16 and 17 will separate when the heater reaches a predetermined temperature. The duration of the flashing period during which the heater 15 is over-energized is determined by the position to which the adjustable contacts 17 is adjusted by the cam surface 21 of the cam means 22.

When the contacts 16 and 17 separate during the initial cycle of operation of the cycling control switch 12, both the main heater 15 and the electromagnet 40 will be deenergized. This releases the armature 36 and permits the contact 33 to close with contact 31, whereafter the heater 15 will be connected for energization at a lower voltage between conductors L₁ and neutral N when the contacts 16 and 17 reclose upon cooling of the bimetal 18. The movable contact 33, being biased toward contact 31, and being movable to engage contact 32 only by manipulation of the cam means 22, will thereafter remain in engagement with contact 31. The electromagnet 40 remains deenergized and the cycling control switch 12 thereafter continues to cycle to open and close the contacts 16 and 17 to maintain a desired average wattage output level of the heater 15, as determined by adjustment of the cam surface 21 of the cam means 22.

As shown in Fig. 1, the cam surface 46 is designed to provide flashing when moved in either direction from "off" and, furthermore, it positions the contact 33 out of engagement with contacts 31 and 32 in the "off" position.

If desired, the cam surface 46 may be constructed as shown in Fig. 3 to provide flashing, followed by normal energization, only by moving the cam means 22 in one direction from "off." This is effected by eliminating the projection 46a and constructing the cam surface portion 46e at the same level as portion 46c. Also, if it should be desired to have contacts 31 and 33 in engagement at the "off" position, the portion 46f of the cam surface 46 intermediate projections 46a and 46b can be constructed at the same level as portion 46d, as shown in Fig. 4. Except for the changes mentioned above, controls using the cam portion shown in Figs. 3 and 4 are identical to and function in the same manner as the control shown in Fig. 1.

The flashing control arrangement described above minimizes the hazards of arcing upon switching the voltage across the heater 15 from a high to a lower value, since the switching is done at a time when the circuit through the heater is completely deenergized. Furthermore, this design of flashing switch permits lengthy travel of the movable contact which effects voltage switching, to further minimize the chances of establishing an arc between contacts 32 and 31, as contact 33 moves therebetween.

While the invention has been shown in several forms, it will be obvious to those skilled in the art that it is not so limited, but is susceptible of various other changes and modifications without departing from the spirit thereof.

This application is a continuation of my copending application Serial No. 640,827, filed February 18, 1957 and now abandoned.

I claim:

1. The combination with a primary electric heater and relatively high and low voltage power sources, of a cycling switch controlling energization of said heater, thermal operated means for alternately opening and closing the switch, means controlled by the switch for heating the thermal operated means, means including a manually operated member for adjusting said cycling switch from an inactive station to a plurality of active stations wherein selective predetermined ratios of the period of time that the cycling switch is closed to the period that the cycling switch is open are effected, a transfer switch structure effective in first and second positions for respectively connecting said primary heater to the high and low voltage power sources, means biasing the transfer switch structure to said second position, an electromagnet energizable for retaining the transfer switch structure in said first position, cam means actuated by the manually operated member for positioning the transfer switch structure, said cam means positioning the transfer switch structure in open position in the inactive station of said manually operated member and releasing the transfer switch in the active positions of the member, means associated with the cam means for actuating the transfer switch momentarily to its first position during movement of the manually operated member from its inactive station to an active station, and a circuit for said electromagnet controlled by the cycling switch and the transfer switch, and switching means, associated with the transfer switch structure, serially connected in said circuit and closed in the first position of the transfer switch structure.

2. A control mechanism for flashing an electrical heater and rapidly increasing its temperature to a desired operating value, said mechanism comprising a transfer switch having a pair of spaced stationary contacts, a third contact movable between a first position in engagement with one of said stationary contacts and a second position in engagement with the other stationary contact, means biasing said third contact toward said second position, an electromagnet energizable for holding said third contact in its first position, a cycling control switch, means for connecting said cycling switch in series with said heater and said electromagnet, cam means for adjusting said cycling switch to vary the percentage of closed contact time during its cycling operation, manually operable means connected to said cam means for moving the latter from an inactive station to any one of a plurality of active stations, means associated with the cam means for actuating the third contact of said transfer switch to its first position during movement of said cam means from its inactive station to an active station thereof, means for energizing said electromagnet under control of said cycling switch during said last-mentioned movement of the cam means, said cam means permitting actuation of said third contact to its second position by the biasing means responsive to deenergization of said electromagnet, and means effective in the inactive station of the cam means for retaining the third contact in a position intermediate its first and second positions.

3. A control for effecting over-energization of an electrical resistance heating element to quickly heat the latter to a desired operating temperature and, thereafter, to regulate the power input to the heater at a lower average value, comprising a cycling control switch having a pair of relatively movable contacts, thermally responsive means for cycling said contacts alternately to open and closed positions, means for heating said thermally responsive means connected in series with said contacts, first cam means for adjusting one of said contacts to vary the duty cycle of said cycling switch, a transfer switch for changing the electrical connections to said heating element, said transfer switch comprising a pair of stationary contacts and a contact movable into engagement with one or the other of said stationary contacts, means for supporting and moving said movable contact to a flashing position for engaging said one of said stationary contacts to energize said heater at a first level that cannot be tolerated continuously and indefinitely by the heater and to a low voltage position for engaging the other stationary contact to energize the heater at a lower level that can be tolerated indefinitely, means for biasing said movable contact toward said low voltage position, an electromagnetic holding means disposed to hold said movable contact in said flashing position against said bias, second cam means for moving said movable contact to said flashing position, and manually adjustable means movable from an inactive station to any of a plurality of active stations for jointly actuating said cam means to adjust said cycling switch and move said movable contact to its flashing position to initiate a period of over-energization of said heater, said electromagnetic holding means being connected in circuit with said cycling switch, said second cam means being constructed to hold said movable contact in a position intermediate said stationary contacts when said manually adjustable means is in its inactive station and to move said movable contact to said flashing position upon movement of said manually adjustable means from said inactive station to an active station, said second cam means releasing said movable contact for movement from said flashing position to the low voltage position to change the circuit connections to said heater upon deenergization of said electromagnet in one active position of said manually adjustable means.

4. A control mechanism for connecting an electrical heater to a power source for over-energizing the heater to quickly heat it to a desired operating temperature and, thereafter, to regulate the wattage input to the heater at a lower average value, comprising a cycling control switch having a pair of relatively movable contacts, a thermally responsive bimetallic strip for actuating one of said contacts, heating means for said bimetallic strip connected in series with said contacts, first cam means associated with one of said contacts for actuating the same to adjust the percentage of closed contact time during operation of said cycling switch, a transfer switch for changing the electrical connections to said heating element, said transfer switch comprising cooperating movable and stationary contact structures, said movable contact structure being movable to a high voltage position in which said heater may be energized at a first level that cannot be tolerated continuously and indefinitely by the heater and to a low voltage position in which the heater may be energized at a lower level that can be tolerated indefinitely, biasing means for moving said movable contact structure toward said low voltage position, a magnetic armature associated with said movable contact structure, an electromagnet disposed relative to said armature to exert a force thereon when energized to hold said movable contact structure in said high voltage position against the force of said biasing means, second cam means associated with said movable contact structure for effecting movement of the latter to said high voltage position, manually adjustable means movable in either of two directions from an inactive station to any of a plurality of active stations for jointly actuating both said cam means to adjust said cycling switch and move said movable contact structure to said high voltage position to initiate a period of over-energization of said heater, means for connecting said electromagnet in series with said cycling switch to retain said movable contact structure in said high voltage position, said electromagnet being deenergized in response to the opening of said cycling switch, said cam means being constructed to permit said movable contact structure to move from said high voltage position to said low voltage position upon deenergization of said electromagnet when said manually adjustable means is in one of its active stations, and switch means connected in circuit with said electromagnet and actuated in response to the deenergization of the latter for maintaining the electromagnet deenergized after the cycling switch is opened to terminate the period of over-energization and during subsequent cycling of the latter.

5. A control mechanism for connecting an electrical heater to a power source for over-energizing the heater to quickly heat it to a desired operating temperature and, thereafter, to regulate the power input to the heater at a lower average value, comprising a cycling control switch having a pair of relatively movable contacts, a thermally responsive bimetallic strip for actuating one of said contacts, heating means for said bimetallic strip connected in series with said contacts, rotatable cam means associated with one of said contacts for actuating the same to adjust the percentage of closed contact time during operation of said cycling switch, a transfer switch for changing the electrical connections to said heating element, said transfer switch comprising cooperating movable and stationary contacts, said movable contact being movable to a flashing position in which said heater is energized at a rate too high for continuous operation of the heater and to a low voltage position in which the heater is energized at a lower rate suitable for continuous operation, biasing means for moving said movable contact toward said low voltage position, a magnetic armature associated with said movable contact, an electromagnet disposed relative said armature to exert a force when energized to hold said movable contact against the force of said biasing means, rotatable cam means associated with said movable contact for effecting movement of the latter to its flashing position, manually adjustable means rotatable in either direction from an inactive station to any of a plurality of active stations for jointly actuating said cam means to adjust said cycling switch and move said movable contact to said flashing position to initiate a period of over-energization of said heater, means for connecting said electromagnet in series with said cycling switch to retain said movable contact in said flashing position, said electromagnet being deenergized in response to the opening of said cycling switch, said cam means being constructed to hold said movable contact in a position intermediate said flashing and low voltage positions when said manually adjustable means is in its inactive station and permitting said movable contact to move from said flashing position to said low voltage position upon deenergization of said electromagnet when said manually adjustable means is in one of said active positions, and switch means connected in circuit with said electromagnet and actuated in response to the deenergization of the latter for maintaining the electromagnet deenergized after the cycling switch is opened to terminate the period of over-energization and during subsequent cycling of the latter.

6. In control apparatus, a transfer switch having spaced stationary high and low voltage contacts adapted to be connected, respectively, with high and low voltage power sources, a movable contact disposed between said high and low voltage contacts and actuatable into engagement therewith separately, means biasing said movable contact into engagement with said low voltage contact, an electromagnet energizable to retain said movable contact in engagement with said high voltage contact, manually operable means movable from an inactive station to an active station and having a portion cooperating with said transfer switch to actuate said movable contact into engagement with said high voltage contact and to effect energization of said electromagnet upon movement of said manually operable means from an inactive station to an active station, and thermostatic means for deenergizing said electromagnet, thereby rendering said biasing means effective to move said movable contact into engagement with said low voltage contact.

7. In control apparatus, a transfer switch having spaced stationary high and low voltage contacts adapted to be connected, respectively, with high and low voltage power sources, a movable contact disposed between said high and low voltage contacts and actuatable into engagement therewith separately, means biasing said movable contact into engagement with said low voltage contact, an electromagnet energizable to retain said movable contact in engagement with said high voltage contact, manually operable means movable from an inactive station to an active station and cooperating with said biasing means to position said movable contact intermediate, and out of engagement with, said high and low voltage contacts in the inactive station of said manually operable means, and having a portion cooperating with said transfer switch to actuate said movable contact into engagement with said high voltage contact and to effect energization of said electromagnet during movement of said manually operable means from an inactive station to an active station, and thermostatic means for deenergizing said electromagnet, thereby rendering said biasing means effective to move said movable contact into engagement with said low voltage contact.

8. In control apparatus, a transfer switch having spaced stationary high and low voltage contacts adapted to be connected, respectively, with high and low voltage power sources, a movable contact actuatable into engagement with said high and low voltage contacts separately, means biasing said movable contact into engagement with said low voltage contact, an electromagnet energizable to retain said movable contact in engagement with said high voltage contact, manually operable means movable from an inactive station to an active station and having a portion cooperating with said transfer switch to actuate said movable contact into engagement with said high voltage contact and to effect energization of said electromagnet during movement of said manually operable means from an inactive station to an active station, and a thermostatic switch for deenergizing said electromagnet, thereby rendering said biasing means effective to move said movable contact into engagement with said low voltage contact.

9. A control for flashing an electrical heater having relatively high and low voltage power sources; comprising a transfer switch having first and second spaced relatively stationary contacts for connection, respectively, to high and low voltage power sources, a third contact supported for movement between a flashing position in engagement with the first contact and a low voltage position in engagement with the second contact, manually operable cam means movable from "off" position to any one of a plurality of active positions, said cam means having a portion cooperating with said transfer switch to actuate said movable contact to its flashing position during movement of said cam means from its "off" position to an active position, electromagnetic means in series with said first contact and energizable for holding said movable contact in its flashing position, means urging said movable contact to its low voltage position, and thermostatic means for deenergizing said electromagnetic means when the electrical heater has flashed to the desired operating temperature, whereupon said urging means is effective to move said movable contact to its low voltage position.

10. Control mechanism for flashing an electrical heater having relatively high and low voltage power sources to rapidly increase its temperature to a desired operating value, said mechanism comprising a thermostatic switch controlling energization of said heater, first adjusting means for adjusting said thermostatic switch, a manually operable member for said first adjusting means movable from an inactive station to any of a plurality of active stations, a transfer switch including spaced stationary high and low voltage contacts adapted to be connected, respectively, with high and low voltage power sources, and a movable contact disposed between said high and low voltage contacts and actuatable into engagement therewith separately, means biasing said movable contact into engagement with said low voltage contact, an electromagnet energizable to retain said movable contact in engagement with said high voltage contact, second adjusting means actuated by said manually operable member for positioning said movable contact intermediate, and out of engagement with, said high and low voltage contacts in the inactive station of said manually operable member and for actuating said movable contact into engagement with said high voltage contact upon movement of said manually operable member from an inactive station to an active station, and a thermostat for deenergizing said electromagnet.

References Cited in the file of this patent

UNITED STATES PATENTS

| | | |
|---|---|---|
| 2,552,480 | Dickey | May 8, 1951 |
| 2,632,085 | Brosseau | Mar. 17, 1953 |
| 2,641,681 | Willman | June 9, 1953 |
| 2,764,662 | Conkling | Sept. 25, 1956 |
| 2,798,929 | Wojcik | July 9, 1957 |
| 2,813,172 | Wojcik | Nov. 12, 1957 |

UNITED STATES PATENT OFFICE

CERTIFICATE OF CORRECTION

Patent No. 2,944,136                                                    July 5, 1960

Calvin J. Holtkamp

It is hereby certified that error appears in the printed specification of the above numbered patent requiring correction and that the said Letters Patent should read as corrected below.

Column 1, line 36, for "coking" read -- cooking --; column 4, line 2, for "removed" read -- moved --.

Signed and sealed this 11th day of April 1961.

(SEAL)
Attest:
ERNEST W. SWIDER

Attesting Officer

ARTHUR W. CROCKER
Acting Commissioner of Patents